United States Patent [19]

Maier et al.

[11] 4,378,582
[45] Mar. 29, 1983

[54] DEMAGNETIZING APPARATUS

[75] Inventors: Bruce R. Maier, Columbia; Bruce A. Hutchins, Rocheport; Richard Fay, Columbia, all of Mo.

[73] Assignee: International Jensen Incorporated, Schiller Park, Ill.

[21] Appl. No.: 332,820

[22] Filed: Dec. 21, 1981

[51] Int. Cl.³ .............................................. G11B 5/46
[52] U.S. Cl. .................................. 361/267; 335/284; 360/128; 361/151
[58] Field of Search .................. 361/149, 151, 267; 335/284; 360/128

[56] References Cited

U.S. PATENT DOCUMENTS

| | | | |
|---|---|---|---|
| 3,647,990 | 3/1972 | Eul, Jr. et al. | 361/267 X |
| 3,655,924 | 4/1972 | Puskas | 361/149 X |
| 3,810,230 | 5/1974 | Orlowski et al. | 361/267 X |
| 3,958,273 | 5/1976 | Alexandrovich, Sr. et al. | 361/267 X |
| 4,135,219 | 1/1979 | Yoshizawa et al. | 361/267 X |

*Primary Examiner*—Harry E. Moose, Jr.
*Attorney, Agent, or Firm*—Hume, Clement, Brinks, Willian & Olds, Ltd.

[57] ABSTRACT

A demagnetizing device for a cassette tape player includes a cassette shell which defines a generally oval-shaped guide track extending around the interior of the shell. A magnet assembly is provided with shafts which fit within the guide track such that the magnet assembly is free to rotate within the guide track and to translate along the length of the guide track. The magnet assembly is rotated by a drive belt which in turn is driven by two hubs rotatably mounted in the cassette shell. An automatic shutoff lever is disclosed which acts automatically to shutoff a tape player equipped with automatic shutoff features when the magnet assembly reaches one of two predetermined positions on the guide track. By properly positioning the guide track, the single magnet assembly can be used to demagnetize multiple components of a tape player distributed around the cassette shell. For example, the single magnet assembly can be used to demagnetize two capstans and a tape head in a single operation.

21 Claims, 8 Drawing Figures

DEMAGNETIZING APPARATUS

BACKGROUND OF THE INVENTION

The present invention relates to equipment for demagnetizing tape equipment such as tape recording and playback heads and tape capstans.

It has been known for some time that magnetic tape recording equipment is susceptible to magnetization. Such magnetization can degrade the performance of tape recording or playback equipment, and it is therefore advisable to demagnetize tape equipment components such as tape heads.

The present invention is directed to a compact, self-contained demagnetizing apparatus which can be used simply and reliably. The preferred embodiments of this invention do not require external power sources, and they operate to demagnetize tape capstans efficiently.

SUMMARY OF THE INVENTION

According to this invention, a demagnetizing apparatus is provided comprising a magnet and a housing which includes a guide track which acts to guide the translation of the magnet in the housing. A drive unit is drivingly coupled to the magnet to rotate the magnet assembly about an axis of rotation and to cause the magnet to move along the guide track simultaneously.

Preferably, the guide track comprises a groove and the magnet is mounted on a spindle which defines a shaft which fits within the groove such that the drive unit causes the magnet to spin about the axis of the shaft and the shaft to spin within the groove. The rotational motion of the shaft against the groove develops a propulsive force which causes the magnet assembly to move along the guide track as the magnet assembly rotates.

In the presently preferred embodiment, the housing comprises a cassette shell and the drive unit comprises two hubs rotatably mounted to the shell and a drive belt positioned around the hubs such that rotation of the hubs causes the belt to move. In this embodiment the hubs, belt, magnet assembly, and guide track are positioned and dimensioned such that the belt is drivingly coupled to the magnet assembly and movement of the belt causes the magnet assembly to rotate about the axis of the shaft. In addition, the presently preferred embodiment of the invention utilizes a guide track that is positioned to bring the magnet assembly adjacent and in alignment with both the capstans of the recording device in order to demagnetize both capstans in a single operation. The preferred embodiment also includes a simple and reliable shutoff lever which operates to increase rotational friction on one of the hubs when the magnet assembly reaches a predetermined point on the guide track, thereby activating the automatic shutoff circuitry of the tape equipment.

The demagnetizing apparatus of this invention provides a number of important advantages. It is a relatively low cost, self-contained apparatus which can be embodied in a standard size cassette shell. It is long lasting, and in the preferred embodiments no external power sources are required. In addition, the arrangement of a rotatable magnet assembly which rotates in and translates along a guide track provides a flexible arrangement in which the guide track can be positioned as desired to bring the magnet assembly adjacent several components of the tape equipment sequentially. For example, in the preferred embodiment, the spinning magnet is made to approach both of the tape capstans of the tape equipment, thereby demagnetizing both components in a single operation.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENT

Figure 1:
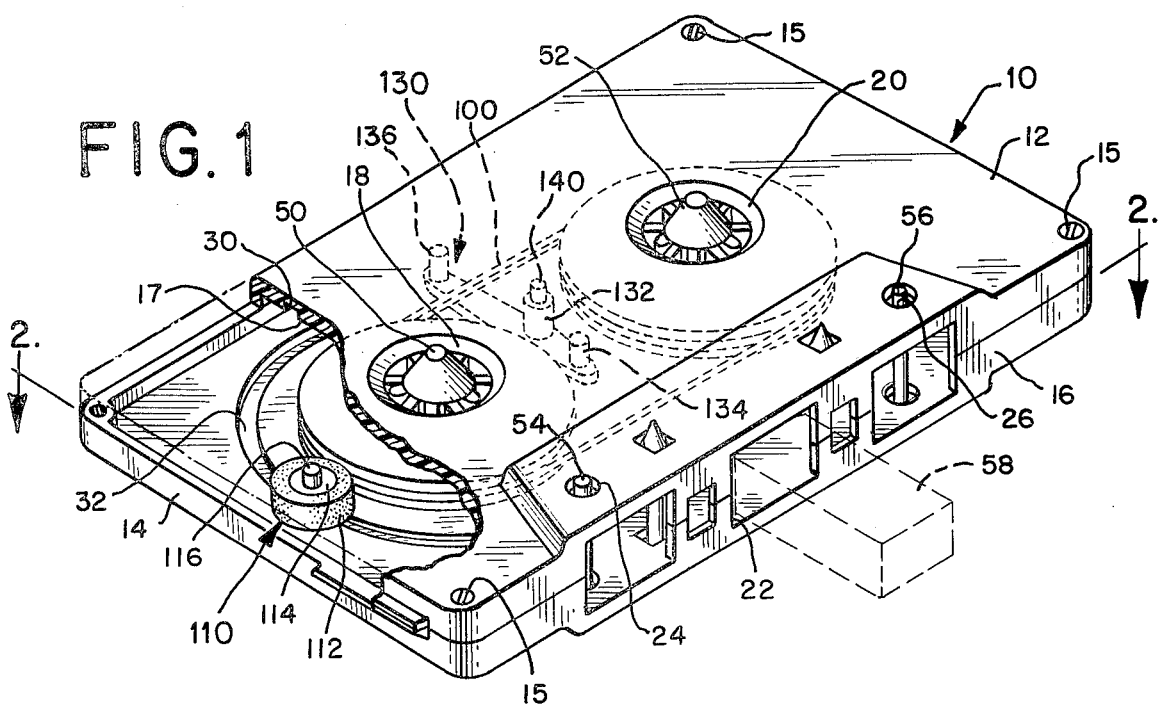
FIG. 1 is a perspective view in partial cut-away of the presently preferred embodiment of this invention.

Turning now to the drawings, FIG. 1 shows a perspective view in partial cutaway of the presently preferred embodiment of this invention. This embodiment includes a housing which in this embodiment comprises a cassette shell 10. The shell 10 is made up of first and second shell sections 12,14, respectively, which are held together by fasteners 15. The shell 10 defines a front edge 16 and an inner surface 17. The shell is an enclosure which defines a number of openings such as the drive shaft openings 18,20, the tape head opening 22 and the capstan openings 24,26.

The drive shaft openings 18,20 are positioned to receive drive shafts 50,52 of a conventional tape player or recorder (not shown). Similarly, the tape head opening 22 is positioned to admit a tape head 58, and the capstan openings 24,26 are positioned to receive capstans 54,56, respectively. The drive shafts 50,52, capstans 54,56 and tape head 58 have been illustrated merely to clarify the function and operation of this embodiment. Of course, these components are customarily found on standard tape players and recorders, and they do not per se form any part of this invention.

The cassette shell 10 of this embodiment is preferably formed in the standard shape and size so as to be suitable for use with standard cassette tape players. The cassette shell 10 can be formed of any suitable material, such as a polystyrene plastic, for example.

Figure 2:
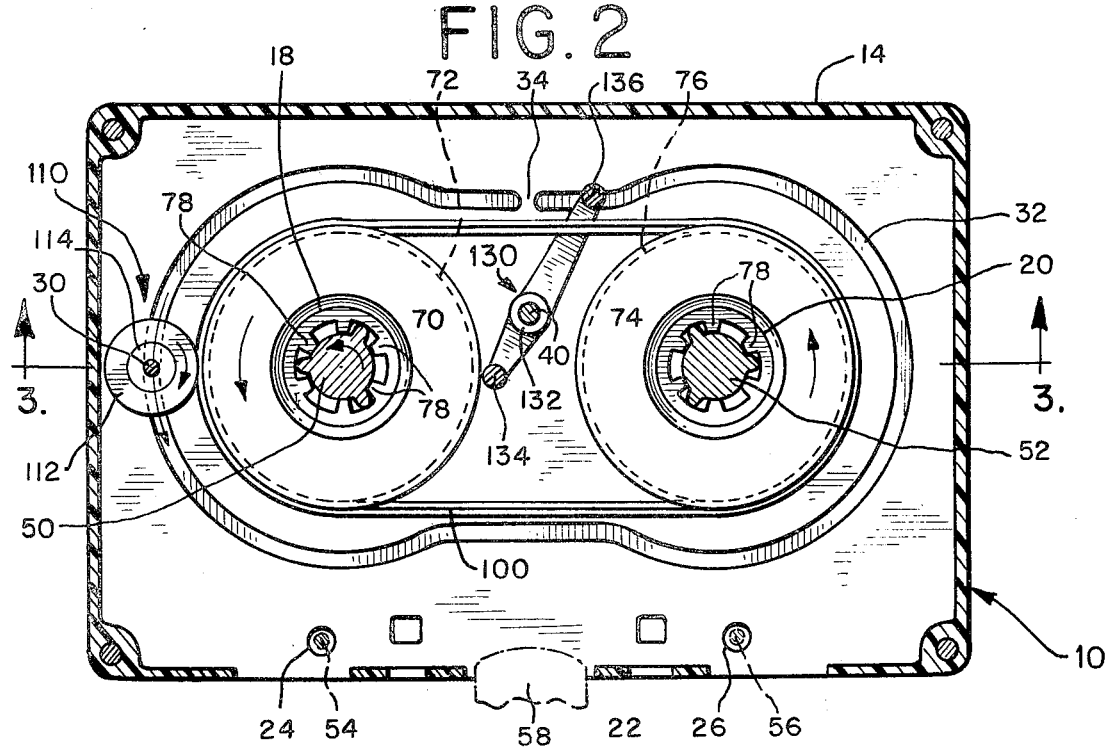
FIG. 2 is a sectional view taken along line 2—2 of FIG. 1.
Figure 3:
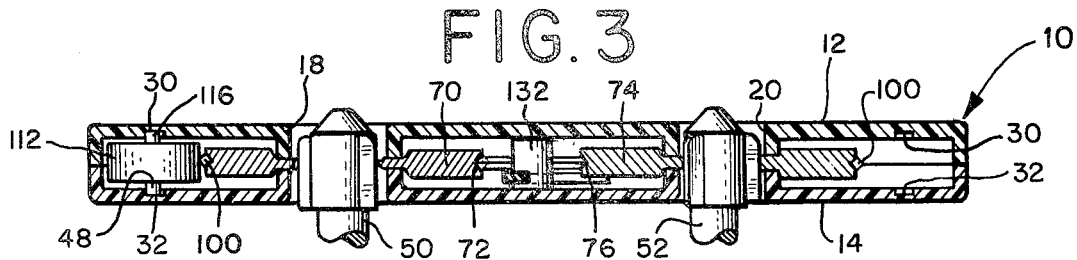
FIG. 3 is a sectional view taken along line 3—3 of FIG. 2.

As best shown in FIGS. 2 and 3, the cassette shell 10 defines on its inner surface 17 a first groove 30 and a second groove 32. The grooves 30,32 are opposed such that one overlies the other. Each of the grooves 30, 32 is substantially oval in shape, and a septum 34 is positioned as shown in FIG. 2 to interrupt each of the grooves 30,32. The grooves 30,32 cooperate to form a guide track which is substantially arcuate in shape at either end and which includes a section which extends generally in the direction of the front edge 16 of the cassette shell, such that the guide track includes portions which are in alignment with both the capstan openings 24,26 and the tape head opening 22. The second section 14 of the cassette shell 10 defines a pivot shaft 40 in the region between the two drive shaft openings 18,20.

Turning now to the moving parts of this embodiment, two hubs 70,74 are rotatably mounted in the cassette shell 10 such that each is centered on a respective one of the two drive shaft openings 18,20. Each of the hubs 70,74 defines respective splines 78 which are configured to mate with the splines of the respective drive shafts 50,52. Each of the hubs 70,74 defines a circumferential groove 72,76, respectively. These grooves 72,76 are sized to receive and hold in place a drive belt 100. In this preferred embodiment, the hubs 70,74 are made of a high lubricity plastic such as Delrin and the belt is made of a 60 durometer neoprene having a cross section of about 0.05 inches on a side. The circumference of the belt 100 should be small enough to hold the belt 100 firmly in place in the grooves 72,76. Thus, the belt 100 is frictionally and drivingly engaged with the hubs 70,74 such that rotation of the hubs 70,74 causes the drive belt 100 to move.

This embodiment also includes a magnet assembly 110 which comprises a permanent toroidal magnet 112 rigidly mounted on a central spindle 114. In this embodiment the magnet 112 is a two-pole magnet in which the magnetic field runs through a diameter. The outer diameter of the magnet 112 is about 12 mm; it is formed of a samarium-cobalt alloy; and its field strength is about 1200 gauss at a distance of 2.5 mm from one of the two poles. Suitable magnets are obtainable from MULTI-Products International of Clifton, N.J. as part No. MAG-S22-S1215.

The spindle 114 defines two opposed, co-axial, guide shafts 116,118. The shafts 116, 118 are sized to fit within the grooves 30,32, respectively. As shown in FIG. 3, the width of the grooves 30,32 is somewhat larger than the diameter of the shafts 116,118 such that the shafts 116,118 are free to rotate within the grooves 30,32, respectively. In this preferred embodiment the shafts 116,118 are molded in the spindle 114, and the spindle 114 is formed of a plastic material such as Delrin. The magnet assembly 110, the grooves 30, 32, the hubs 70,74 and the drive belt 100 are so dimensioned and positioned that rotation of the hubs 70,74 causes the magnet assembly 110 to be rotated by frictional contact with the drive belt 100.

With reference to FIG. 2, when the hubs 70,74 are rotated as shown by the arrows, the magnet 112 is rotated in a clockwise manner. This causes the shafts 116,118 to rotate in a clockwise manner against the outer walls of the grooves 30,32, respectively. This rotation of the shafts 116,118 causes the entire magnet assembly 110 to move along the guide track in the direction of the arrow. Thus, the drive belt 100 simultaneously spins the magnet 112 about the axis of the shafts 116,118 and causes the magnet assembly 110 to translate along the guide track formed by the grooves 30,32. The ratio between the diameter of the shafts 116,118 and the diameter of the magnet 112 should be chosen to provide the desired ratio between angular and translational velocity of the magnet 112. In this embodiment, the diameter of the shafts 116,118 is 1.55 mm and the outer diameter of the magnet 112 is 12 mm, for a ratio of about 1:8. For many embodiments, it is preferable that this ratio be less than 1:4.

Figure 8:
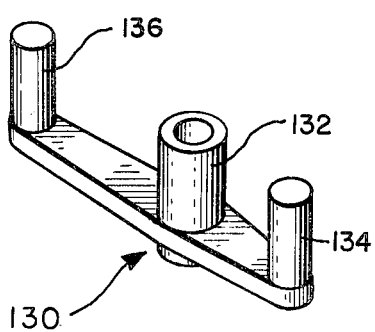
FIG. 8 is a detailed perspective view of the shutoff lever of the embodiment of FIG. 1.
Figure 7:
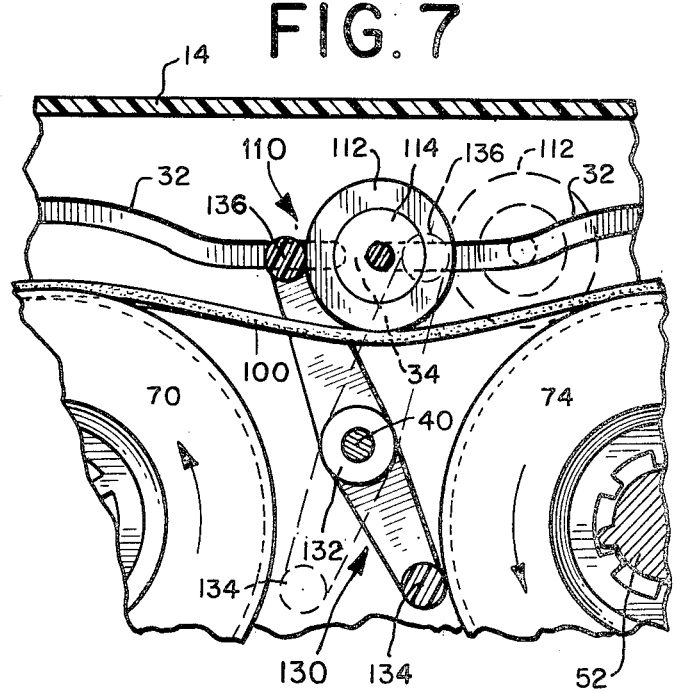
FIG. 7 is a partial view corresponding to FIG. 2, illustrating the operation of the shutoff lever.

As shown in FIGS. 2, 7 and 8, this embodiment also includes a shutoff lever 130 which comprises a central sleeve 132 pivotably mounted on the pivot shaft 40 of the cassette shell 10. This shutoff lever 130 defines a first arm 134 and a second arm 136. The operation of the shutoff lever 130 will be described below in connection with FIG. 7.

Figure 4:
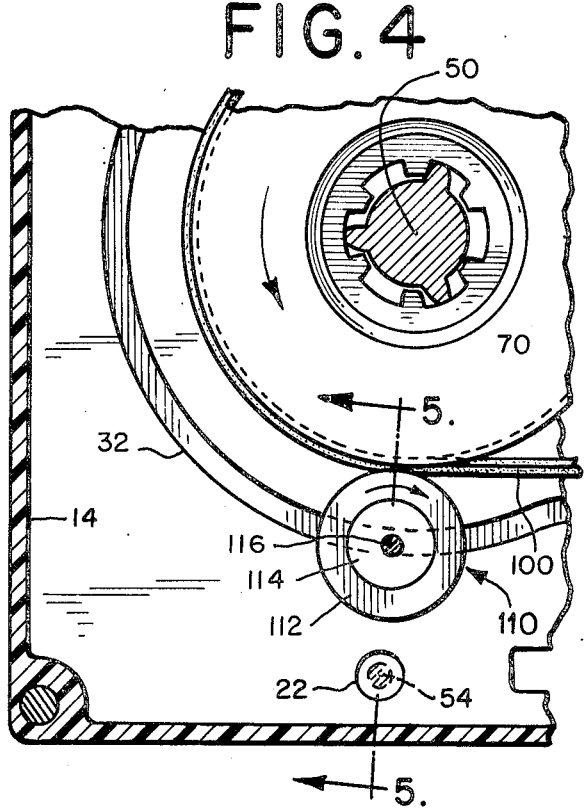
FIG. 4 is a partial view corresponding to that of FIG. 2, showing the magnet assembly in alignment with one of the two capstans.
Figure 6:
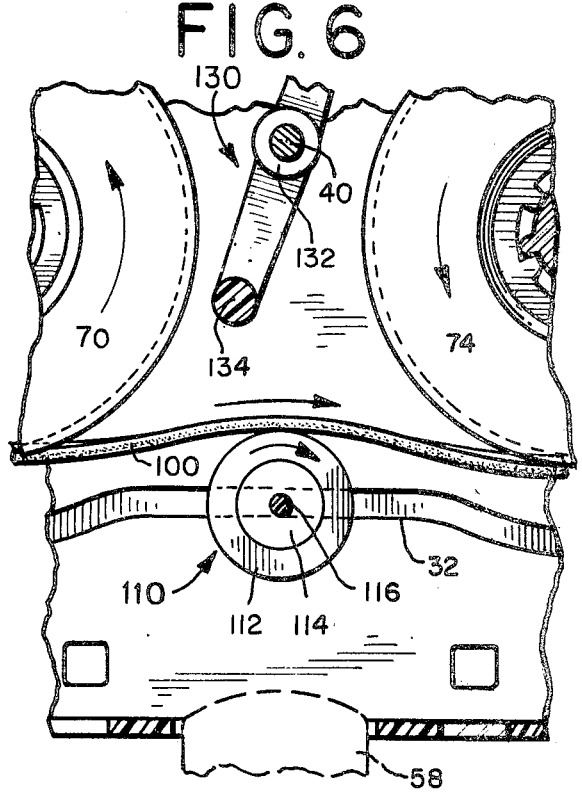
FIG. 6 is a partial view corresponding to FIG. 2, showing the magnet assembly in alignment with the tape head.
Figure 5:
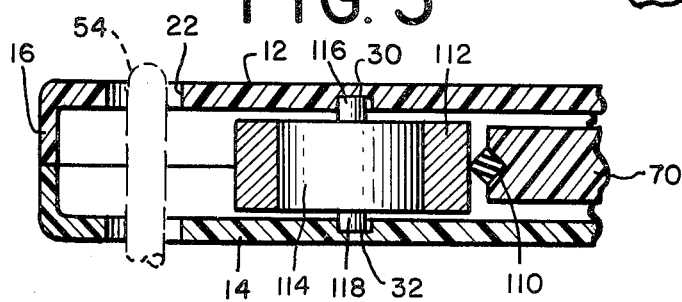
FIG. 5 is a sectional view taken along line 5—5 of FIG. 4.

FIGS. 2, 4 and 6 show the magnet assembly 110 in three consecutive positions as it moves along the guide track formed by the first and second grooves 30,32. When the magnet assembly 110 is in the position shown in FIG. 4, the magnet 112 is in alignment with and at its point of closest approach to the capstan 54 and the capstan opening 22. FIG. 5 shows a sectional view which illustrates the geometry of the guide track, magnet assembly 110, and capstan 54 at the point of closest approach. In this embodiment, the minimum separation between the magnet 112 and the center of the capstan opening 22 is about 0.1 inch. Minimum separations as large as about 0.13 inch provide excellent results in many alternative embodiments. Similarly, when the magnet assembly 110 is in the position shown in FIG. 6, the magnet 112 is in alignment with and at its point of closest approach to the tape head 58.

Turning now to FIGS. 7 and 8, the shutoff lever 130 is used to shutoff the tape player (not shown) when the magnet assembly 110 reaches either end of the guide track adjacent the septum 34. In FIG. 7, dotted lines are used to indicate a first position of the shutoff lever 130 and the magnet assembly 110. In this first position the shutoff lever 130 exerts no frictional drag on either of the hubs 70,74. As the magnet assembly 110 is propelled by the drive belt 100 to the left as shown in FIG. 7 it comes into contact with the second arm 136 of the shutoff lever 130, and causes the shutoff lever 130 to pivot about the pivot shaft 40 into the position shown in solid lines in FIG. 7. In this position, the magnet assembly 110 pushes the first arm 134 of the shutoff lever 130 into the hub 74, thereby increasing frictional drag on the hub 74. It has been found that sufficient rotational drag can be generated by the shutoff lever 130 to cause the automatic shutoff circuitry of the tape player (not shown) automatically to stop the drive shafts 50,52. Thus, this preferred embodiment, once activated, will move the magnet assembly 110 from its initial position to one end of the guide track adjacent the septum 34, and will then automatically shut the tape player off. It is desirable to leave the magnet assembly 110 adjacent the septum 34 when the tape player is shut off, because in this position the magnet 112 is situated at a considerable distance from the tape head 58 and capstans 54,56.

When the cassette shell 10 is stored between uses, it is preferable that it be stored in a metal foil covered case (not shown) to protect magnetic tapes and the like from damage due to the magnet 112.

In the illustrated embodiment, the guide track is situated near the drive belt 100 between the hubs 70,74 in order to enhance frictional engagement between the belt 100 and the magnet assembly 110. If it is desired to bring the magnet assembly 110 nearer to the tape head 58, the guide track can be made to approach the tape head 58, and means such as idler rollers can be provided to press the belt 100 against the magnet assembly 110 in the region between the hubs 70,74.

From the foregoing description of the structure and operation of the presently preferred embodiment, it should be apparent that this embodiment provides a number of important advantages. First, the use of the guide track in conjunction with the magnet and the spindle provides a flexible means for moving the spinning magnet about within the cassette shell 10 so that the spinning magnet can be made to approach various components of the tape player. The generally oval shaped configuration shown in FIG. 2 has been found to be well adapted for demagnetization of both capstans 54,56 of the tape player. This provides improved demagnetization of the capstans, components which have in the past often been neglected in demagnetization devices.

Second, the disclosed device is simple, reliable, inexpensive to fabricate, and entirely self-contained in operation. The apparatus of this invention can be embodied in standard sized cassettes for use in standard cassette players.

The foregoing drawings have shown the presently preferred embodiment of this invention. It should be understood, however, the various changes and modifications to this embodiment can be made within the scope of this invention. For example, the magnet assembly can in some applications be formed of a single magnetic piece. Alternate applications may advantageously use only a single shaft in the magnet assembly and only a single groove in the guide track. Furthermore, the guide track can be formed of separate structural elements rather than being integrally formed as a groove in the housing, and the guide track does not necessarily comprise a groove in all embodiments. This invention is not limited to cassettes of the type shown, but rather can be adapted to various video cassettes or even to other types of housings unrelated to cassettes. Furthermore, in some applications it may be preferable to extend the guide track only along a line near one edge of the housing, such that the guide track does not enclose an area of the housing. This invention is applicable to demagnetizing devices for the entire range of magnetic tape equipment, including audio, video, and digital signal storage equipment, for example.

It is therefore intended that the foregoing detailed description be regarded as illustrative of the presently preferred embodiment rather than as limiting the scope of this invention. It is intended that the following claims, including all equivalents, define the scope of this invention.

I claim:

1. An apparatus for demagnetizing first and second capstans of a tape unit, said apparatus comprising:
    a housing which defines a first capstan opening positioned to admit the first capstan and a second capstan opening positioned to admit the second capstan;
    a guide track included in the housing;
    a magnet, coupled to the guide track to travel along the guide track; and
    means for driving the magnet to cause the magnet to spin about an axis of rotation and simultaneously to cause the magnet to travel along the guide track;
    said guide track positioned with respect to the first and second capstan openings such that the magnet sequentially moves between a point aligned with the first capstan opening and a point aligned with the second capstan opening as it travels along the guide track.

2. The invention of claim 1 wherein the housing comprises a cassette shell.

3. The invention of claim 1 wherein the guide track comprises a groove defined in the housing and the invention further comprises a spindle having an axial shaft positioned in the groove, wherein the magnet is mounted to the spindle.

4. The invention of claim 3 wherein the drive means comprises:
    two hubs rotatably mounted to the housing; and
    a drive belt positioned around the hubs such that rotation of the hubs causes the belt to move;
    said hubs, belt, magnet, and guide track positioned and dimensioned such that the belt is drivingly coupled to the magnet and movement of the belt causes the magnet to rotate about the axis of the shaft.

5. A demagnetizing apparatus comprising:
    a magnet assembly comprising a magnet and a spindle, said spindle defining at least one axial shaft;
    a housing which comprises a guide track which receives the shaft; and
    a drive unit drivingly coupled to the magnet assembly to rotate the magnet assembly to cause the magnet to spin about the axis of the shaft and the axial shaft to spin within the guide track, the rotational motion of the shaft against the guide track developing a propulsive force which causes the magnet assembly to move along the guide track as the magnet assembly rotates.

6. The invention of claim 5 wherein the housing comprises a cassette shell.

7. The invention of claim 5 wherein the drive unit comprises:
    two hubs rotatably mounted to the housing; and
    a drive belt positioned around the hubs such that rotation of the hubs causes the belt to move;
    said hubs, belt, magnet assembly, and guide track positioned and dimensioned such that the belt is drivingly coupled to the magnet assembly and movement of the belt causes the magnet assembly to rotate about the axis of the shaft.

8. The invention of claim 5 wherein the at least one shaft comprises two co-axial shafts and the guide track comprises two opposed grooves, each positioned to receive a respective one of the two shafts.

9. An apparatus for demagnetizing tape equipment comprising:
    a cassette shell defining a front edge, two drive shaft openings, each positioned to receive a respective drive shaft, two spaced openings, each spaced to receive a respective capstan, and a tape head opening positioned to admit a tape head, said two spaced openings and said tape head opening positioned near said front edge of the cassette shell;
    a guide track oriented to extend along at least a portion of the front edge in a spaced relationship to the two spaced openings and the central opening;
    a magnet assembly comprising a magnet and a spindle positioned to rotate within and to move along the guide track such that the guide track determines the minimum separation between the magnet and the two spaced openings and the minimum separation between the magnet and the tape head opening; and
    means for spinning the magnet assembly to cause the magnet to rotate with respect to the cassette shell and the spindle to spin within the guide track to cause the magnet assembly to move along the guide track.

10. The invention of claim 9 wherein the spinning means comprises:

two hubs, each rotatably mounted to the cassette shell to rotate about a respective one of the two drive shaft openings;

a drive belt extending around and frictionally engaging the hubs;

said hubs, drive belt, and guide track dimensioned and positioned such that the drive belt drivingly engages the magnet assembly and rotation of the hubs causes the spindle to rotate within and move along the guide track.

11. The invention of claim 10 wherein the guide track is substantially oval-shaped and the hubs are positioned within the guide track.

12. The invention of claim 9 wherein the cassette shell defines an interior surface and wherein the guide track comprises two opposed grooves defined by the interior surface of the cassette shell.

13. The invention of claim 9 wherein the minimum separation between the magnet and the centers of each of the two spaced openings is less than about 0.13 inch.

14. An apparatus for demagnetizing tape equipment comprising:

a cassette shell;

a guide track defined by the cassette shell;

a rotatable magnet assembly, said assembly comprising a magnet and a spindle positioned to rotate within and move along the guide track;

first and second hubs rotatably mounted within the cassette shell;

a drive belt positioned around the hubs such that rotation of the hubs causes the belt to move;

said guide track, magnet assembly, hubs and drive belt positioned and dimensioned such that the drive belt is drivingly engaged with the magnet assembly and rotation of the hubs causes the magnet assembly spindle to rotate within and move along the guide track.

15. The invention of claim 14 wherein the cassette shell defines an interior surface and wherein the guide track comprises two opposed grooves defined by the interior surface of the cassette shell.

16. The invention of claim 14 wherein the cassette shell defines two spaced openings, each sized to receive a respective capstan, and wherein the guide track is positioned to guide the magnet assembly from a first point adjacent one of the spaced openings to a second point adjacent the other of the spaced openings.

17. The invention of claim 14 or 16 wherein the guide track is substantially oval-shaped and the guide track extends around the hubs.

18. The invention of claim 14 further comprising:

a shutoff lever;

means for pivotably mounting the lever to the cassette shell between the hubs, said lever pivotable into a first position, in which the lever frictionally engages one of the hubs;

said lever defining a magnet assembly contact end positioned to contact the magnet assembly when the magnet assembly reaches a predetermined point in the guide track such that the magnet assembly moves the lever into the first position to frictionally retard the rotation of said one hub.

19. An apparatus for demagnetizing a tape head and at least one capstan of a tape player, said apparatus comprising:

a cassette shell defining a capstan opening positioned to receive a capstan, a tape head opening positioned to receive a tape head, and two spaced drive shaft openings, each positioned to receive a respective drive shaft, said cassette shell having an interior surface which defines two opposed, substantially oval-shaped grooves extending around the drive shaft openings such that both the tape head opening and the capstan opening are positioned outside the guide track;

two hubs, each rotationally mounted to the cassette shell and centered on a respective one of the two drive shaft openings;

a drive belt extending around the hubs within the guide track;

a magnet spindle defining two opposed guide shafts, each positioned to rotate within and move along a respective one of the two grooves;

a magnet mounted on the spindle to rotate with the spindle;

said grooves positioned, and said hubs, drive belt, spindle, and magnet dimensioned such that the belt drivingly engages the magnet and rotation of the hubs causes the magnet to spin about the axis of the guide shafts and the guide shafts to frictionally engage the grooves to propel the spindle and magnet along the grooves.

20. The invention of claim 19 further comprising:

a shutoff lever having a first end;

means for pivotably mounting the shutoff lever to the cassette shell such that the first end of the shutoff lever extends between the two hubs and the lever is positioned to contact the magnet when the magnet reaches a predetermined point in the grooves, thereby causing the movement of the magnet in the grooves to pivot the lever to push the first end of the lever against one of the two hubs to retard rotation of the one hub.

21. The invention of claim 19 wherein the diameter of each of the guide shafts is less than about one-quarter the diameter of the magnet.

* * * * *